(12) United States Patent
Lee et al.

(10) Patent No.: US 9,594,536 B2
(45) Date of Patent: Mar. 14, 2017

(54) METHOD AND APPARATUS FOR ELECTRONIC DEVICE COMMUNICATION

(75) Inventors: Keith Shu Key Lee, Markham (CA); Syed Athar Hussain, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 1032 days.

(21) Appl. No.: 13/340,075

(22) Filed: Dec. 29, 2011

(65) Prior Publication Data

US 2013/0174208 A1 Jul. 4, 2013

(51) Int. Cl.
*G06F 3/14* (2006.01)
*H04N 21/41* (2011.01)
*H04N 21/4363* (2011.01)
*H04N 21/643* (2011.01)

(52) U.S. Cl.
CPC ........... *G06F 3/14* (2013.01); *H04N 21/4122* (2013.01); *H04N 21/43637* (2013.01); *H04N 21/64322* (2013.01); *G09G 2370/042* (2013.01); *G09G 2370/06* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 6,789,154 B1 | 9/2004 | Lee et al. | |
| 2002/0059637 A1* | 5/2002 | Rakib | 725/119 |
| 2002/0161928 A1* | 10/2002 | Ndili | 709/246 |
| 2003/0055327 A1* | 3/2003 | Shaw | H04L 29/06 600/407 |
| 2003/0106066 A1* | 6/2003 | Sakai | 725/105 |
| 2003/0225912 A1* | 12/2003 | Takeda | H04L 29/06027 709/246 |
| 2004/0230356 A1* | 11/2004 | Namaky | G06F 11/2733 701/33.2 |
| 2005/0063520 A1* | 3/2005 | Michaelis | H04M 3/42391 379/52 |
| 2005/0108430 A1* | 5/2005 | Howarth | H04L 63/083 709/245 |
| 2005/0181643 A1 | 8/2005 | Brower et al. | |
| 2006/0029051 A1* | 2/2006 | Harris et al. | 370/356 |
| 2006/0034266 A1* | 2/2006 | Harris et al. | 370/356 |
| 2006/0068907 A1* | 3/2006 | DiMichele | G07F 17/32 463/30 |
| 2006/0075126 A1* | 4/2006 | Lehrschall | H04L 29/06027 709/229 |

(Continued)

OTHER PUBLICATIONS

International Search Report and Written Opinion from Canadian Patent Office; International Application No. PCT/CA2011/001410; dated Sep. 14, 2012.

(Continued)

*Primary Examiner* — Ninos Donabed
(74) *Attorney, Agent, or Firm* — Faegre Baker Daniels LLP

(57) ABSTRACT

The present disclosure relates to a method and apparatus for electronic device communication. A method includes translating monitor control commands to an internet protocol (IP) format to produce IP formatted monitor control commands, and communicating the IP formatted monitor control commands to an IP port dedicated for communicating IP formatted monitor control commands.

38 Claims, 13 Drawing Sheets

(56) References Cited

U.S. PATENT DOCUMENTS

| | | | |
|---|---|---|---|
| 2006/0209745 A1* | 9/2006 | MacMullan | G06F 3/1454 370/328 |
| 2007/0054734 A1* | 3/2007 | Morrow et al. | 463/29 |
| 2007/0162945 A1* | 7/2007 | Mills | H04N 7/17318 725/119 |
| 2007/0198283 A1* | 8/2007 | Labuda | G06Q 10/06 705/1.1 |
| 2007/0294096 A1* | 12/2007 | Randall | G06Q 30/00 705/1.1 |
| 2008/0120141 A1* | 5/2008 | Kariathungal | G06F 3/013 705/3 |
| 2008/0120576 A1* | 5/2008 | Kariathungal | G06F 3/04883 715/863 |
| 2008/0291324 A1* | 11/2008 | Hong | H04N 21/43637 348/484 |
| 2009/0077298 A1 | 3/2009 | Whitby-Strevens et al. | |
| 2009/0106422 A1* | 4/2009 | Kriewall | H04L 67/14 709/225 |
| 2010/0131991 A1* | 5/2010 | Tao | G09G 5/006 725/80 |
| 2012/0079551 A1* | 3/2012 | Isozaki | H04N 21/4104 725/118 |

OTHER PUBLICATIONS

European Search Report dated Jun. 1, 2015 from European Patent Application No. 11879125.0.
"Ethernet Converter Device FMod-TCB Box 2 User Manual", Nov. 2, 2011 XP055190708, retrieved from the Internet: URL:http://wwwfiveco.ch/product-fmod-tcp-box-2.html (retrieved on May 21, 2015).

* cited by examiner

Remote I2C Read Request Structure

700

| FIELD | SIZE (OCTETS) | DESCRIPTION |
|---|---|---|
| REQUEST IDENTIFIER | 1 | THIS FIELD SHOULD BE SET TO 0X00 TO INDICATE REMOTE_I2C_READ_REQUEST. |
| NUMBER_OF_I2C_WRITE_TRANSACTIONS | 1 | THE TOTAL NUMBER OF I2C WRITE TRANSACTIONS TO BE SENT IN THIS MESSAGE TRANSACTION. |
| FOR (I=0; I <NUMBER_OF_I2C_WRITE_TRANSACTIONS - 1; I++) { | | |
| WRITE_I2C_DEVICE_IDENTIFIER[I] | 1 | THE I2C DEVICE IDENTIFIER TO RECEIVE THE WRITE REQUEST |
| NUMBER_OF_BYTES_TO_WRITE[I] | 1 | THE NUMBER OF DATA BYTES TO WRITE TO THE I2C DEVICE |
| FOR (J=0; J < NUMBER_OF_BYTES_TO_WRITE; J++) I2C_DATA_TO_WRITE[I][J] | 1 | THE I2C WRITE DATA FOR THE WRITE DEVICE. TOTAL NUMBER OF BYTES TO WRITE FOR EACH WRITE TRANSACTION IS EQUAL TO NUMBER_OF_BYTES_TO_WRITE[I] |
| NO_STOP_BIT[I] | 1 | WHEN SET TO A 0X01, A STOP BIT IS NOT SENT AT THE END OF THE I2C TRANSACTION; OTHERWISE WHEN SET TO A 0X00, A STOP WILL BE GENERATED AT THE END OF THE I2C TRANSACTION. |
| I2C_TRANSACTION_DELAY[I] } | 1 | THE AMOUNT OF DELAY TO INSERT BETWEEN THIS AND THE NEXT I2C TRANSACTION. THE DELAY UNIT IS 10MS. THE DELAY RANGE IS 0 TO 150 MS. |
| READ_I2C_DEVICE_IDENTIFIER | 1 | THE I2C DEVICE IDENTIFIER TO RECEIVE THE READ REQUEST. |
| NUMBER_OF_BYTES_TO_READ | 1 | THE NUMBER OF DATA BYTES REQUESTED TO READ FROM THE I2C DEVICE. |

702

Remote I2C Write Request Structure

720

| FIELD | SIZE (OCTETS) | DESCRIPTION |
|---|---|---|
| REQUEST IDENTIFIER | 1 | FIELD SET TO 0X01 TO INDICATE REMOTE_I2C_WRITE_REQUEST. |
| WRITE_I2C_DEVICE_IDENTIFIER | 1 | THE I2C DEVICE IDENTIFIER TO RECEIVE THE WRITE REQUEST. |
| NUMBER_OF_BYTES_TO_WRITE | 1 | THE NUMBER OF DATA BYTES TO WRITE TO THE I2C DEVICE. |
| FOR (J=0; J < NUMBER_OF_BYTES_TO_WRITE; J++) I2C_DATA_TO_WRITE[I] | 1 | THE I2C WRITE DATA FOR THE WRITE DEVICE TOTAL NUMBER OF BYTES TO WRITE IS EQUAL TO NUMBER_OF_BYTES_TO_WRITE. |

Remote I2C Read Reply Acknowledge Success

| FIELD | SIZE (OCTETS) | DESCRIPTION |
|---|---|---|
| REPLY IDENTIFIER | 1 | FIELD SET TO 0X00 TO INDICATE REMOTE_I2C_READ_REPLY_ACK. |
| NUMBER_OF_BYTES_TO_READ | 1 | THE NUMBER OF DATA BYTES READ FROM THE I2C DEVICE. |
| FOR (I=0; I < NUMBER_OF_BYTES_READ; I++) I2C_DEVICE_BYTE_READ | 1 | A DATA BYTE READ FROM THE I2C DEVICE |

740

Remote I2C Read Reply Acknowledge Failure

| FIELD | SIZE (OCTETS) | DESCRIPTION |
|---|---|---|
| REPLY IDENTIFIER | 1 | FIELD SET TO 0X80 TO INDICATE REMOTE_I2C_READ_REPLY_NAK. |

750

Remote I2C Write Reply Acknowledge Success

| FIELD | SIZE (OCTETS) | DESCRIPTION |
|---|---|---|
| REPLY IDENTIFIER | 1 | FIELD SET TO 0X01 TO INDICATE REMOTE_I2C_WRITE_REPLY_ACK. |

760

Remote I2C Write Reply Acknowledge Failure

| FIELD | SIZE (OCTETS) | DESCRIPTION |
|---|---|---|
| REPLY IDENTIFIER | 1 | FIELD SET TO 0X81 TO INDICATE REMOTE_I2C_WRITE_REPLY_NAK. |

FIG. 7.2

METHOD AND APPARATUS FOR ELECTRONIC DEVICE COMMUNICATION

FIELD OF THE DISCLOSURE

The present disclosure is generally related to the field of image display systems, and more particularly to methods and systems for communication between a display source and a display sink over a communication link.

BACKGROUND

Conventional display systems typically include a wired connection between a display source (e.g, computer, DVD/Blu-ray device, cell phone, set-top box, etc.) and a display sink (e.g., a device that receives data for producing an image such as but not limited to a computer monitor, television, projector, hub, etc.) for communicating multimedia data and other display controls and capability data. Wired communication links or interfaces between the display source and the display sink may include video graphics array (VGA), digital video interface (DVI), high definition multimedia interface (HDMI), DisplayPort (DP), and other wired communication interfaces. The communication interface may include an Inter-Integrated Circuit (I2C) bus for communicating monitor control commands and monitor capability information between the display source and the display sink. The I2C bus is a multi-wire (typically including a data wire and a clock wire), bidirectional communication bus that provides for serial communication between connected components.

Referring to FIG. 1, an exemplary known display system 10 is illustrated that utilizes an I2C bus for communicating monitor control commands and monitor capability data. Display system 10 includes a display source 12, such as a computer (e.g., laptop, desktop, tablet, etc.), cell phone, DVD/Blueray device, set-top box, etc., that is operative to provide audio/video data or other multi-media data to a display sink 14 for display on a monitor 16 (e.g., display, screen, etc.) of display sink 14. Display sink 14 may include a computer monitor device, a television, a video/image projector, or any other suitable display sink 14 operative to display image data (e.g., video, graphics, etc.) and/or to convert audio data into sound. The connections lines between components of display system 10 illustrated in FIG. 1 represent physical electrical connections (e.g., conductors, wires) between the components.

Display source 12 includes an image provider 18 that is operative to generate or decode audio and image (video or graphics) data. Image provider 18 may include a graphics processor (e.g. one or more GPU cores), decoder, or other control unit operative to generate or decode multimedia data, such as audio, video, and other image data. In some embodiments, image provider 18 further includes a main processor (e.g., one or more CPU cores) that includes an operating system operative to issue control commands to display sink 14 and to request data from display sink 14. In one embodiment, a graphics processor and a main or central processor are provided in an integrated circuit of image provider 18, although processors and logic components of image provider 18 may comprise separate devices. Display source 12 includes a memory 20, internal or external to image provider 18, containing data, such as image or control data, accessible by image provider 18. Memory 20 may include software or firmware with program instructions that when executed by a processor of image provider 18 performs one or more computing tasks. Memory 20 may also include image data used by image provider 18 to provide video or graphics data.

Display sink 14 illustratively includes a monitor controller 26 operatively coupled to monitor 16 and to a memory 28. Monitor controller 26, which may include a processor or other suitable logic that is operative to process multimedia data, such as audio data and video and/or graphics image data, received from image provider 18 of display source 12 and to provide the processed data to monitor 16 for display on monitor 16. As described herein, monitor controller 26 is also operative to control monitor 16 based on control commands received from display source 12 and to provide monitor capability data to display source 12. Memory 28 may be internal or external to monitor controller 26 and stores data, such as image or control data, accessible by monitor controller 26 for controlling monitor 16. Memory 20 may further include software or firmware with program instructions that when executed by a processor of monitor controller 26 performs one or more computing tasks associated with monitor 16. Memory may be any suitable memory including but not limited to RAM, ROM, EEPROM, DDRAM, optical memory, distributed memory in differing devices such as web servers or any suitable non-transitory memory.

A display interface 22 of display source 12 provides a communication interface between image provider 18 of display source 12 and display sink 14. Similarly, a display interface 24 of display sink 14 provides a communication interface between monitor controller 18 of display sink 14 and display source 12. Display interfaces 22, 24 may include a video graphics array (VGA), digital video interface (DVI), high definition multimedia interface (HDMI), DisplayPort (DP), or other communication interface. A communication cable 30 is coupled from display interface 22 to display interface 24. Communication cable 30 includes a connector cable or wire, or other suitable wired connector, that is compatible with the communication interface (e.g., VGA, DVI, HDMI, DP, etc.) of display interfaces 22, 24. Communication cable 30 illustratively includes an audio/video bus 32 for communicating audio, video, other image data, and various controls from display source 12 to display sink 14. Audio/video bus 32 is illustratively unidirectional from display source 12 to display sink 14. In the illustrated embodiment, communication cable 30 further includes an I2C bus 34 for communicating monitor control commands and monitor capability information between display source 12 and display sink 14. Audio/video bus 32 and I2C bus 34 are illustratively provided in a single communication cable 30. In one embodiment with a DisplayPort interface, communication cable 30 includes a pair of auxiliary (AUX) wires rather than an I2C bus 34 for communicating the monitor control commands and monitor capability information between display interfaces 22, 24.

I2C bus 34 communicates monitor control commands and monitor capability information between display source 12 and display sink 14. Capability information may include extended display identification data (EDID) or other suitable data representing the display capabilities of monitor 16. EDID includes a data structure provided at display sink 14, such as at memory 28 accessible by monitor controller 26, that describes to display source 12 the display and operational capabilities of monitor 16. Exemplary capability data includes graphics modes, frame rate, display size and aspect ratio, resolution, color capabilities, and other suitable monitor capability information. Image provider 18 performs multiple functions or operations based on the EDID structure. Upon reading the EDID structure, image provider 18 is configured to identify the type and capabilities of monitor 16 and to tailor the audio/video data (or other image data) to conform to the capabilities of the monitor 16. For example, image provider 18 may scale the video or image content provided to display sink 14 based on whether monitor 16 has enabled overscan functionality, as determined from the display capability information in the EDID structure. In another example, image provider 18 performs color management based on the display gamut and related information of monitor 16 provided in the EDID structure. Other operations may be performed by image provider 18 based on EDID information and other control/capability information.

Monitor control commands communicated over I2C bus 34 may include Monitor Command and Controls Set (MCCS) commands or other suitable monitor control commands provided from display source 12 to display sink 14 for controlling the display properties of monitor 16. Each MCCS command includes various data parameters and command attributes operative to control the display properties of monitor 16. MCCS commands are operative to restore factory defaults (e.g., color, geometry, brightness/contrast, and other presets/defaults) of the monitor 16, to control color temperature, hue, and saturation, to adjust display geometry (e.g., parallelogram, pincushion, etc.), and to control image display parameters. Exemplary image display parameters include display orientation, zoom, brightness, contrast, gamma, focus, backlight control, white point, and other image parameters. The I2C bus 34 may be used to transfer other display setup information. In one embodiment, monitor display sink 14 provides reply data or controls over I2C bus 34 to display source 12 in response to monitor control commands.

In one embodiment, the I2C bus 34 utilizes Display Data Channel and/or Command Interface (DDC/CI) communication protocol to communicate EDID information, MCCS commands, and other data or monitor control commands between display source 12 and display sink 14. DDC/CI protocol may provide a "plug and play" environment such that display source 12 and display sink 14 are able to communicate upon connection to the I2C bus 34.

Monitor controller 26 controls monitor 16 based on the monitor control commands from display source 12. For example, upon image provider 18 issuing an MCCS command or other monitor control command to display sink 14 via the IC2 bus 34, the monitor controller 26 displays the video or other image data, or processes audio data, in accordance with the issued commands. Similarly, upon image provider 18 issuing an EDID request via the IC2 bus 34, monitor controller 26 provides the EDID information of monitor 16 to display source 12 via the I2C bus 34.

The I2C bus 34 is configured to communicate low-level messaging transactions (e.g., single byte messages) between image provider 18 of display source 12 and monitor controller 26 of display sink 14. These low-level messages may include read or write commands, such as read/write replies and requests. In one embodiment, I2C bus 34 includes two wires, i.e., a data wire and a clock wire, that provides for serial communication between display source 12 and display sink 14. For example, in one embodiment, information from the EDID structure, MCCS commands, and other display data or monitor control commands are transmitted over I2C bus 34 a single byte at a time. As such, a monitor control command, for example, may include a plurality of low level (e.g., single byte) messaging transaction requests. Another suitable multi-wired, bidirectional communication bus may be provided as an alternative to I2C bus 34 for handling the communication of low-level messaging transactions containing monitor control and capability information.

Some display systems 10 are operative to provide audio/video data to the display sink 14 over a computer networking protocol, such as an internet protocol (IP) format including Transmission Control Protocol/Internet Protocol (TCP/IP) or User Datagram Protocol (UDP), for example. Rather than being directly connected with a communication interface 30 such as VGA, DVI, HDMI, DP, or other wired interface, the display source 12 and display sink 14 are connected via an IP link to remotely communicate with each other over a wired or wireless IP network. However, such IP communication links do not support the communication of I2C read/write messaging transactions (e.g., MCCS commands, DDC/IC protocol, EDID information, etc.) between the display source 12 and the display sink 14. Without a mechanism to enable the communication of remote I2C read/write messaging transactions over an IP interface, some or all operations performed by the image provider 18 based on the monitor control commands and capability data previously communicated via I2C bus 34 may be either compromised or performed at the display sink 14. However, performance of such operations by the display sink 14 results in increased complexity of the display sink 14 and increased likelihood of compatibility issues between the display source 12 and the display sink 14. Further, the processor(s) and/or control logic of the image provider 18 of display source 12 is typically much more flexible in operation and is better adapted to handle changes in the monitor control/capabilities.

Therefore, a need exists for methods and systems to communicate monitor control commands and other monitor data between a display source and a display sink using a network protocol communication interface, such as an internet protocol (IP) communication interface.

SUMMARY OF EMBODIMENTS OF THE DISCLOSURE

In an exemplary embodiment of the present disclosure, a method carried out by an electronic device is provided. The method includes translating monitor control commands to an network protocol format to produce network protocol formatted monitor control commands. The method further includes communicating the network protocol formatted monitor control commands to a network protocol port dedicated for communicating network protocol formatted monitor control commands.

Among other advantages, the method and apparatus allows for communication of monitor control commands, monitor capability information, and other monitor data between a display source and a display sink using a network protocol (e.g., internet protocol (IP)) communication interface, such as a wireless interface. The enabled communication of monitor control commands, capability data, and other data intended for communication over an I2C bus, for example, allows a display source communicating over an IP communication interface to control the display operations and the display features and capabilities of the display system, as described herein. Other advantages will be recognized by those of ordinary skill in the art.

In one example, the translating the monitor control commands to a network protocol format to produce network protocol formatted monitor control commands includes translating monitor control commands intended for communication over a multi-wire bidirectional bus. In another example, the communicating the network protocol formatted monitor control commands to the dedicated network protocol port includes identifying a network protocol port of a destination device, such as a display sink, and dedicating the identified network protocol port for communicating network protocol formatted monitor control commands. In yet another example, the translating the monitor control commands to a network protocol format to produce network protocol formatted monitor control commands includes generating a high level messaging transaction structure from a plurality of low level messaging transaction requests or replies, and converting the high level messaging transaction structure into network protocol packets. In still another example, the method further includes converting single-byte based monitor read or write commands into multi-byte monitor read or write requests. In another example, the method further includes re-translating network protocol formatted monitor control commands from a network protocol format to produce monitor control commands intended for communication over a multi-wire bidirectional bus, and controlling operation of a monitor based on the produced monitor control commands intended for communication over the multi-wire bidirectional bus. In another example, the network protocol format includes an internet protocol (IP) format, and the network protocol port includes an internet protocol (IP) port.

In another exemplary embodiment of the present disclosure, a method carried out by an electronic device is provided. The method includes translating network protocol formatted monitor control commands from a network protocol format to produce monitor control commands intended for communication over a multi-wire bidirectional bus. The method further includes controlling operation of a monitor based on the produced monitor control commands intended for communication over the multi-wire bidirectional bus. In one example, the network protocol format includes an internet protocol (IP) format.

In another exemplary embodiment of the present disclosure, a wireless device is provided including a wireless transceiver and logic operatively coupled to the wireless transceiver. The logic is operative to translate monitor control commands to an internet protocol (IP) format to produce IP formatted monitor control commands and to communicate the IP formatted monitor control commands to an IP port dedicated for communicating IP formatted monitor control commands. In one example, the logic is operative to identify an IP port of a destination device, such as a display sink, as the dedicated IP port.

In yet another exemplary embodiment of the present disclosure, a wireless device is provided including a wireless transceiver and logic operatively coupled to the wireless transceiver. The logic is operative to translate internet protocol (IP) formatted monitor control commands from an IP format to produce monitor control commands intended for communication over a multi-wire bidirectional bus and to control operation of a monitor based on the produced monitor control commands intended for communication over the multi-wire bidirectional bus.

In still another exemplary embodiment of the present disclosure, a wireless display is provided including a monitor and a controller operatively coupled to the monitor and operative to provide image data to the monitor for display on the monitor. The wireless display further includes a wireless device, operatively coupled to the controller, including a wireless transceiver and logic. The logic is operative to translate internet protocol (IP) formatted monitor control commands from an IP format to produce monitor control commands intended for communication over a multi-wire bidirectional bus. The controller controls operation of the monitor based on the produced monitor control commands intended for communication over the multi-wire bidirectional bus.

In another exemplary embodiment of the present disclosure, a display system is provided including a display source and a wireless display. The display source includes a short range wireless transceiver and logic operatively coupled to the short range wireless transceiver. The logic is operative to translate monitor control commands to an internet protocol (IP) format to produce IP formatted monitor control commands and to communicate the IP formatted monitor control commands to an IP port dedicated for communicating IP formatted monitor control commands. The wireless display includes a monitor, a controller operatively coupled to the monitor for controlling the monitor, and a wireless device operatively coupled to the controller. The wireless device includes a short range wireless transceiver and logic. The short range wireless transceiver of the wireless device is operative to receive the IP formatted monitor control commands from the short range wireless transceiver of the display source. The logic of the wireless device is operative to translate the received IP formatted monitor control commands from the IP format to produce monitor control commands intended for communication over a multi-wire bidirectional bus. The controller controls operation of the monitor based on the produced monitor control commands intended for communication over the multi-wire bidirectional bus. In one example, the IP port dedicated for communicating IP formatted monitor control commands is an IP port associated with the wireless device of the wireless display.

BRIEF DESCRIPTION OF THE DRAWINGS

The invention will be more readily understood in view of the following description when accompanied by the below figures and wherein like reference numerals represent like elements:

FIG. 7.1 illustrates exemplary read and write request messaging transaction structures provided with the wireless source device of FIGS. 2 and 3;

FIG. 7.2 illustrates exemplary read and write reply messaging transaction structures provided with the wireless sink device of FIGS. 2 and 3;

DETAILED DESCRIPTION

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The term "remote communication" and "remote device" and variations thereof, as used herein, refers to communication and to devices adapted for communication over an internet protocol (IP) wireless or wired communication link, such as a Transmission Control Protocol/Internet Protocol (TCP/IP) or a User Datagram Protocol (UDP), for example.

Figure 1:
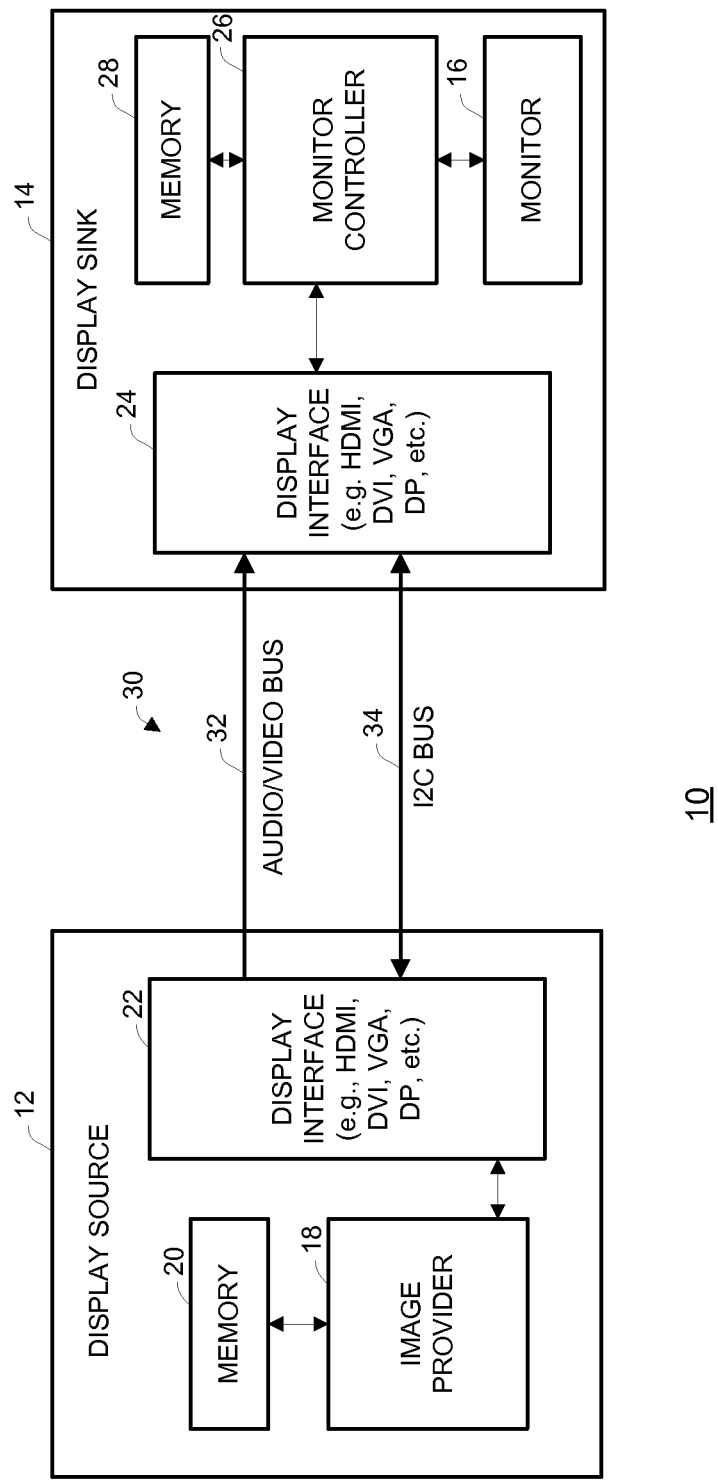
FIG. 1 is a block diagram of a prior known image display system including a display source and a display sink communicating over a wired communication link.
Figure 2:
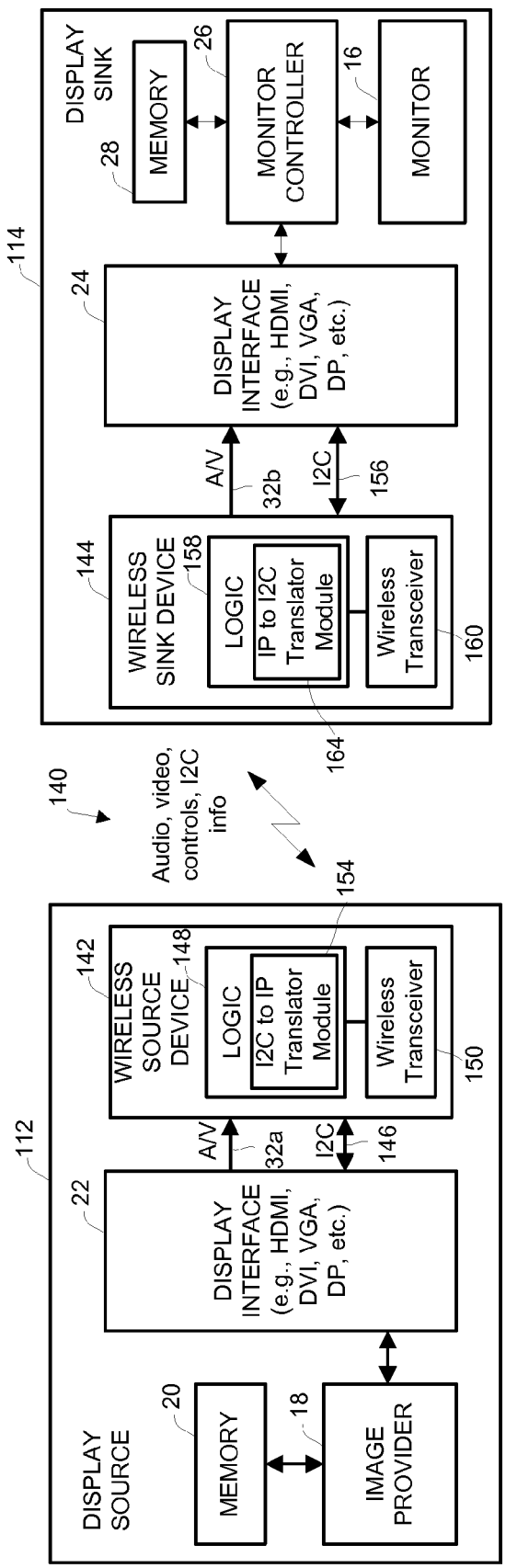
FIG. 2 is a block diagram of an exemplary image display system in accordance with an embodiment including a display source with an integrated wireless source device and a display sink with an integrated wireless sink device.

FIG. 2 illustrates an exemplary image display system 100 according to various embodiments that is configured to communicate monitor control commands and other monitor data over an internet protocol (IP) communication interface 140. Image display system 100 may be viewed as modifying the known image display system 10 described in FIG. 1. For example, display source 112 of FIG. 2 may be viewed as a modification of the display source 12 of FIG. 1 further including a wireless source device 142, and display sink 114 of FIG. 2 may be viewed as a modification of the display sink 14 of FIG. 1 further including a wireless sink device 144. Like components of image display system 10 of FIG. 1 and image display system 100 of FIG. 2 are provided with like reference numbers. Various other arrangements of internal and external components and corresponding connectivity of image display system 100, that are alternatives to what is illustrated in the figures, may be utilized and such arrangements of internal and external components and corresponding connectivity would remain in accordance with the embodiments herein disclosed.

Display source 112 includes memory 20, image provider 18, and display interface 22, as described herein with respect to FIG. 1. Wireless source device 142 of display source 112 is operatively coupled to display interface 22 via audio/video bus 32a for communicating audio, video, other image data, and various controls from image provider 18 to wireless source device 142. Audio/video (A/V) bus 32a illustratively provides unidirectional communication from image provider 18 to wireless source device 142, although A/V bus 32a may alternatively be bi-directional. An I2C bus 146 communicates monitor control commands and monitor capability information, described above with respect to I2C bus 34 of FIG. 1, between image provider 18 and wireless source device 142.

Display sink 114 includes memory 28, monitor controller 26, monitor 16, and display interface 24, as described herein with respect to FIG. 1. Wireless sink device 144 of display sink 114 is operatively coupled to display interface 24 via audio/video bus 32b for communicating audio, video, other image data, and various controls from wireless sink device 144 to monitor controller 26. Audio/video (A/V) bus 32b illustratively provides unidirectional communication from wireless sink device 144 to monitor controller 26, although A/V bus 32b may alternatively be bi-directional. An I2C bus 156 communicates monitor control commands and monitor capability information, described above with respect to I2C bus 34 of FIG. 1, between wireless sink device 144 and monitor controller 26.

The operation and structure, as well as the data and controls communicated, of I2C bus 146, 156 is as described above with respect to I2C bus 34 of FIG. 1. For example, I2C bus 146 communicates EDID information, MCCS commands, and other display data and monitor control commands between image provider 18 and source device 142, and I2C bus 156 communicates the EDID information, MCCS commands, and other display data and monitor control commands between wireless sink device 144 and monitor controller 26. In one embodiment, I2C buses 146, 156 communicate commands and data using DDC and/or CI protocol, described herein. In one embodiment, A/V bus 32a and I2C bus 146 are provided in a common, multi-conductor communication bus, and A/V bus 32b and I2C bus 156 are provided in a common, multi-conductor communication bus. A/V bus 32a, 32b and I2C bus 146, 156 are configured with the same communication interface as respective display interfaces 22, 24, which may include a video graphics array (VGA), digital video interface (DVI), high definition multimedia interface (HDMI), DisplayPort (DP), or other communication interface.

Wireless source device 142 includes a wireless transceiver 150 operative to communicate data and controls wirelessly in an internet protocol (IP) format over a communication link or channel 140 with a wireless transceiver 160 of wireless sink device 144. For example, transceivers 150, 160 include wireless antennas that communicate the EDID information, MCCS commands, and other display data and monitor control commands, as well as the audio/video data and other image data and controls received via A/V bus 32a, over IP formatted communication link 140. Exemplary IP formatted protocols of communication link 30 and transceivers 150, 160 include Transmission Control Protocol/Internet Protocol (TCP/IP) or User Datagram Protocol (UDP), for example. In the illustrated embodiment, wireless transceivers 150, 160 are short range wireless transceivers operative to communicate at short range distances. Exemplary short range wireless protocols include IEEE 802.11 protocols (e.g., 802.11a, 802.11b, 802.11g, 802.11n, 802.11 ac, 802.11 ad, etc.), Wireless Gigabyte Alliance (WiGig) protocol, Bluetooth, communications access for land mobiles (CALM), and other suitable short range protocols. For example, in one embodiment using an IEEE 802.11 protocol, transceivers 150, 160 may communicate at distances of up to several hundred feet or up to several thousand meters. Other protocols may communicate at distances of up to about 30 meters or other suitable distances. Alternatively, transceivers 150, 160 may configured to communicate at greater distances. In one embodiment, source and sink devices 142, 144 are operationally compliant with a wireless standard, such as the wireless display standard WFD from WiFi Alliance.

While wireless source device 142 and wireless sink device 144 illustratively communicate wirelessly over the IP communication link 140, wireless source device 142 and wireless sink device 144 are also adapted to communicate via a wired IP communication interface, such as over Ethernet cables or other suitable IP communication cables or wires. For example, in one embodiment, transceivers 150, 160 of source device 142 and sink device 144, respectively, each include a wired IP communication connector that is adapted to receive an IP communication cable (e.g., Ethernet cable) to connect source device 142 and sink device 144 for IP formatted communication therebetween.

Referring still to FIG. 2, source device 142 further includes logic 148 coupled to transceiver 150. In one embodiment, logic 148 includes one or more processors (e.g. microprocessor, etc.) or other controllers with access to a memory that includes software and/or firmware code containing instructions that, when executed by the processor, cause the processor to perform the functions and operations of source device 142. Logic 148 may alternatively include discrete logic stored in a memory of source device 142 that is operative to perform the functions and operations of source device 142. For example, logic 148 is operative to convert the audio, video, and other image data received over audio/video bus 32a from image provider 18 into an internet protocol (IP) format suitable for transmission over IP communication link 140.

In the illustrated embodiment, logic 148 includes a translator module 154 that is operative to translate or convert monitor control commands and other data received over I2C bus 146 (i.e., from image provider 18) from the I2C format to an internet protocol (IP) format to produce IP formatted monitor control commands suitable for communication over IP communication link 140 to sink device 144. The translated monitor control commands include the MCCS commands, described herein, requests for EDID information, or other suitable monitor control commands. For example, translator module 154 is operative to translate read/write requests from image provider 18 sent over I2C bus 146, such as a request for the EDID information stored at memory 28 of display sink 114, to IP formatted requests. In one embodiment, logic 148 sends the IP formatted monitor control commands to transceiver 150 by writing to a memory accessible by transceiver 150 and/or to I/O locations associated with transceiver 150.

Logic 148 identifies an IP port (e.g., IP number or address) associated with translator module 164 of sink device 144, and designates the identified IP port for the communication of the IP formatted monitor control commands and other data over communication link 140 with translator module 164. In one embodiment, logic 148 of source device 142 negotiates with logic 158 of sink device 144 to determine the dedicated IP ports of translator module 164 and translator module 154. In one embodiment, translator modules 154 and 164 communicate over network layer 3. Logic 148 also identifies a media access control (MAC) address of transceiver 160 of sink device 144 to identify the destination device (transceiver 160) that receives the communicated information and data. In one embodiment, transceivers 150, 160 include both data link layer 2 and physical layer 1. In one embodiment, a MAC frame communicated between transceivers 150, 160 carries the layer 3 data as the MAC frame payload.

Similarly, translator module 154 is operative to re-translate IP formatted commands and data, such as monitor capability data (e.g., EDID information), received over communication link 140 from sink device 144 into a format suitable for communication over I2C bus 146. For example, upon receiving IP formatted monitor capability data from display sink 114 via transceiver 150 at a designated IP port, translator module 154 converts the IP formatted monitor capability data into a format intended for communication over I2C bus 146, such as DDC and/or CI protocol.

Referring still to FIG. 2, sink device 144 further includes logic 158 coupled to transceiver 160. In one embodiment, logic 158 includes one or more processors (e.g. microprocessor, etc.) or other controller with access to a memory that includes software and/or firmware code containing instructions that, when executed by the processor, cause the processor to perform the functions and operations of sink device 144. Logic 158 may alternatively include discrete logic stored in a memory of sink device 144 that is operative to perform the functions and operation of sink device 144. For example, logic 158 is operative to convert the IP formatted audio, video, and other image data received over IP communication link 140 from display source 112 into a format suitable for transmission over I2C bus 156 of display sink 114, such as DDC/CI protocol format.

In the illustrated embodiment, logic 158 includes a translator module 164 that is operative to translate or convert IP formatted monitor control commands and other data received over IP communication link 140 into monitor control commands and data intended for communication over I2C bus 156 of display sink 114. The translated monitor control commands include the MCCS commands, requests for EDID information, or other suitable monitor control commands received from display source 112. For example, translator module 164 is operative to translate IP formatted read/write requests from display source 112 sent over IP communication link 140, such as a request for the EDID information stored at memory 28 of display sink 114, to read/write requests suitable for communication over I2C bus 156. Upon translation, logic 158 communicates the translated monitor control commands over I2C bus 156 and interface 24 to monitor controller 26, and monitor controller 26 controls monitor 16 based on the translated monitor control commands. To communicate with display source 112, logic 158 identifies an IP port (e.g., IP number or address) associated with translator module 154 of source device 142, and designates the identified IP port for the communication of the IP formatted monitor control commands, monitor capability data, and other data over communication link 140 with translator module 154. In one embodiment, logic 158 and logic 148 negotiate the designation of the IP ports of translator modules 154, 164, as described herein. Logic 158 also identifies a media access control (MAC) address of transceiver 150 of source device 142 to identify the device (transceiver 150) that provides or receives communicated information and data.

Translator module 164 is further operative to re-translate or convert monitor capability data and other data received over I2C bus 156 (i.e., from monitor controller 26) from the I2C format to an internet protocol (IP) format to produce IP formatted monitor capability data suitable for communication over IP communication link 140 to source device 142. For example, upon translator module 154 receiving and translating a request from display source 112 for monitor capability data (e.g., EDID structure) and sending the I2C formatted request to monitor controller 26, monitor controller 26 provides the monitor capability data in an I2C format to sink device 144 via I2C bus 156. Translator module 164 then translates the monitor capability data from the I2C intended format to IP formatted monitor capability data and provides the data to transceiver 160 for communication over IP communication link 140 to transceiver 150. In one embodiment, logic 158 sends the IP formatted data to transceiver 160 for communication over link 140 by writing to a memory accessible by transceiver 160 and/or to I/O locations associated with transceiver 160.

Logic 148 of source device 142 and logic 158 of sink device 144 are configured to translate multimedia and control data communicated over audio/video buses 32a, 32b between the IP format and the native format (e.g., HDMI, DVI, VGA, DP, etc.) such that the data may be communicated over IP communication link 140 and to the respective image provider 18 and monitor controller 26. While audio/video buses 32a, 32b and IP communication link 140 of image display system 100 illustratively communicate audio and video data, other image data, such as graphics data, etc., may also be communicated via buses 32a, 32b and link 140.

In one embodiment, image provider 18 is configured to control the power settings and on/off status of monitor 16 using monitor control commands sent over communication link 140. For example, image provider 18 may issue MCCS commands to turn on and off monitor 16, to reduce or manage the power of monitor 16, and/or to control other power settings of monitor 16.

Source device 142 and sink device 144 of FIG. 2 are illustratively integrated with display source 112 and display sink 114, respectively. For example, source device 142 and sink device 144 are provided as one or more chips on a common circuit board or within a common housing of components of respective display source 112 and display sink 114.

In another embodiment, logic 148 of integrated source device 142 is included in image provider 18 of display source 112. For example, referring to FIG. 12, another exemplary display source 870 is illustrated including image provider 18 providing IP formatted I2C messaging transactions (e.g., monitor capability data requests, monitor control commands, etc.) to wireless transceiver (Wi-Fi device) 150 as internet protocol (IP) packets. Integrated display source 870 may be viewed as modifying the display source 112 described in FIG. 2. In the display source 870 of FIG. 12, logic 148 of image provider 18 is operative to translate read/write requests (e.g., from an operating system of image provider 18) intended for communication over an I2C bus into IP packets containing IP formatted monitor control commands and other data, and image provider 18 communicates the IP packets over bus 871 to transceiver 150 for communication over the IP link 140 (see FIG. 2). Similarly, logic 148 is operative to re-translate IP formatted commands and data, such as monitor capability data (e.g., EDID information), received over communication link 140 from display sink 114 (FIG. 2) into a format readable by image provider 18, such as a format intended for communication over an I2C bus. An exemplary bus 871 includes a peripheral component interconnect express (PCIe) bus, a USB bus, or another suitable bus operative to communicate IP formatted information and data. IP formatted audio and video data is also transmitted over bus 871 of FIG. 12 for communication with transceiver 150. In this embodiment, a physical I2C bus 146 (see FIG. 2) is not utilized for the communication of the monitor control commands and capability data. In one embodiment, logic 148 is provided in one or more CPU cores and/or GPU cores, or in other suitable processors, of image provider 18.

Logic 148 also identifies an IP port (e.g., IP number or address) associated with translator module 164 of sink device 144, and designates the identified IP port (e.g., communicates the IP port to an operating system of image provider 18) for the communication of the IP formatted monitor control commands and other data over communication link 140 with translator module 164, as described herein. Logic 148 also identifies a MAC address of transceiver 160 of sink device 144 to identify the device (transceiver 160) that receives or provides the communicated information and data, as described herein.

Referring again to FIG. 2, either or both source device 142 and sink device 144 may alternatively be discrete devices coupled externally to respective display source 112 and display sink 114. For example, referring to FIG. 3, an image display system 200 includes a discrete wireless source device 242 coupled externally to display source 212 with a connector 270 and a discrete wireless sink device 244 coupled externally to display sink 214 with a connector 272. Image display system 200 of FIG. 3 may be viewed as modifying the image display system 100 of FIG. 2, i.e., discrete wireless source device 242 of FIG. 3 replaces integrated wireless source device 142 of FIG. 2, and discrete wireless sink device 244 of FIG. 3 replaces integrated wireless sink device 144 of FIG. 2.

In one embodiment, source device 242 and sink device 244 are small, portable devices, such as dongles, including respective connectors 270, 272 configured to plug into an external port or connector of respective display source 212 and display sink 214. In one embodiment, each device 242, 244 is less than about two inches in length and one inch in width. Other suitable sizes of devices 242, 244 may be provided. Connectors 270, 272 illustratively include the respective A/V buses 32a, 32b for communicating audio, video, and other image data and I2C buses 146, 156 for communicating monitor control commands, monitor capability data, and other data, as described herein with respect to FIGS. 1 and 2. Connectors 270, 272 may include an HDMI, DP, universal serial bus (USB) interface, or other suitable interface configured to mate with a corresponding port of the respective display interface 22, 24. In one embodiment, depending on the interface type of connectors 270, 272, respective logic 248, 258 may include a module for converting the communicated data and controls into a format suitable for communication over the connector 270, 272. For example, a USB type connector 270, 272 may require an additional translation of the communicated data between the USB supported format and the IC2 or IP supported format.

Source and sink devices 242, 244 include the components and functionality of respective source and sink devices 142, 144 of FIG. 2. For example, source device 242 includes a wireless transceiver 250 for communication of monitor control commands, monitor capability data, and other data converted from an I2C format to an IP format, as described herein with respect to transceiver 150 of FIG. 2. Source device 242 further includes logic 248 including a translator module 254 corresponding to logic 148 and translator module 154 of FIG. 2, described herein. Similarly, sink device 244 includes a wireless transceiver 260 for communication of monitor control commands, monitor capability data, and other data converted from an I2C format to an IP format, as described herein with respect to transceiver 160 of FIG. 2. Sink device 244 further includes logic 258 including a translator module 264 corresponding to logic 158 and translator module 164 of FIG. 2, described herein.

Source and sink devices 242, 244 are also adapted to communicate via a wired IP communication interface 140, such as over Ethernet cables or other suitable IP communication cables or wires. Similar to transceivers 150, 160 of FIG. 2, transceivers 250, 260 may each include a wired IP communication port or connector that is adapted to receive an IP communication cable (e.g., Ethernet cable) to connect source device 242 and sink device 244 for IP formatted communication therebetween.

Figure 3:
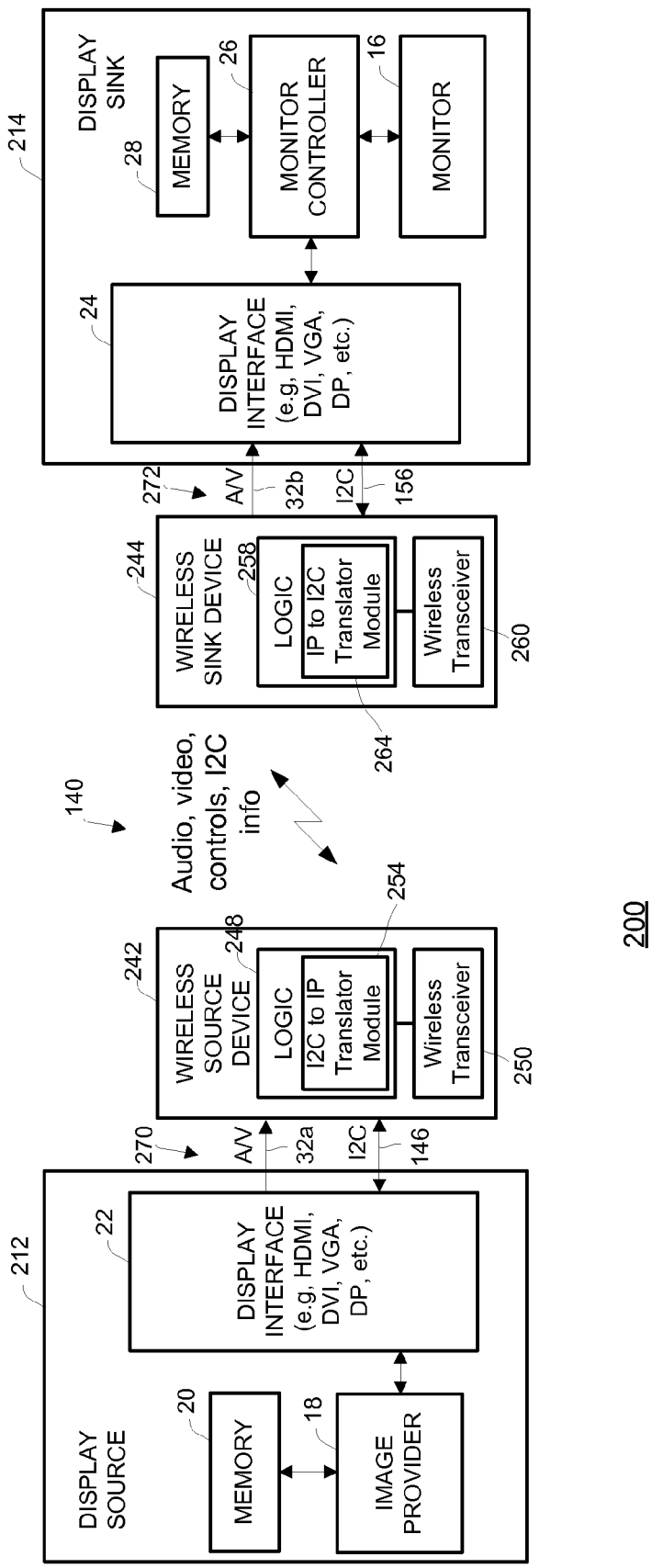
FIG. 3 is a block diagram of another exemplary image display system in accordance with an embodiment including a display source with a discrete wireless source device and a display sink with a discrete wireless sink device.
Figure 4:
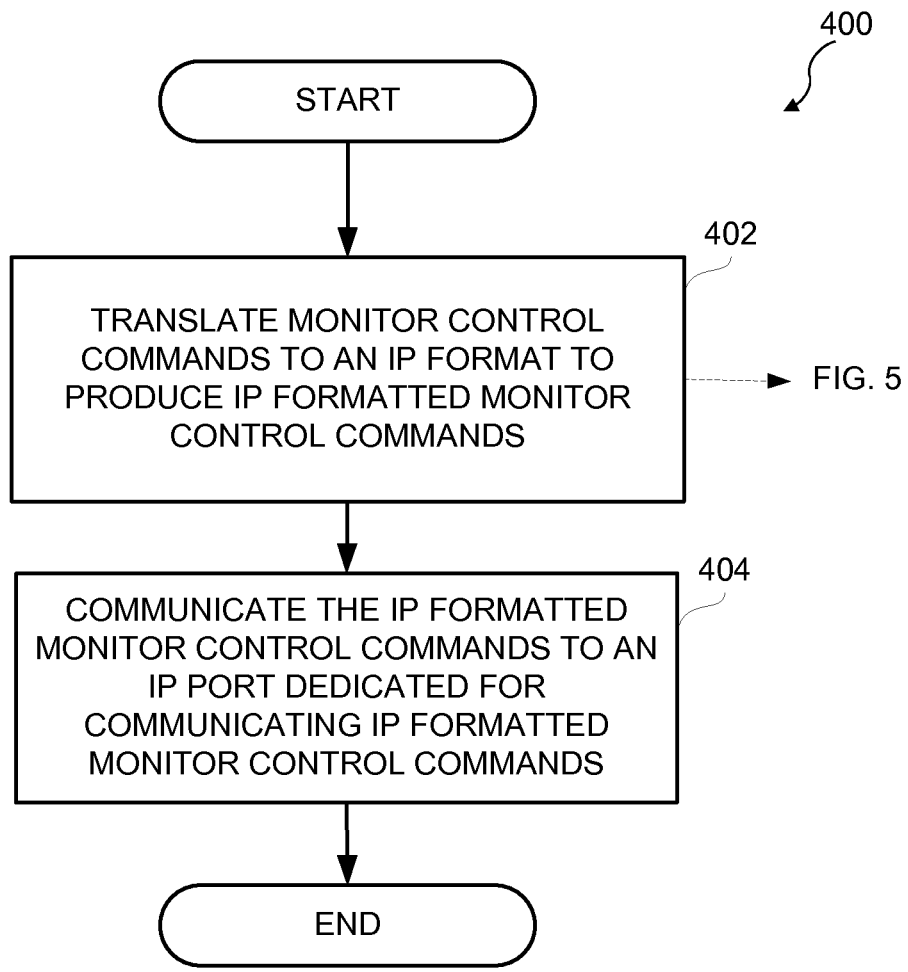
FIG. 4 is a flow chart of an exemplary method of operation of the display source of FIGS. 2 and 3 for communicating monitor control commands over an internet protocol (IP) communication interface.
Figure 12:
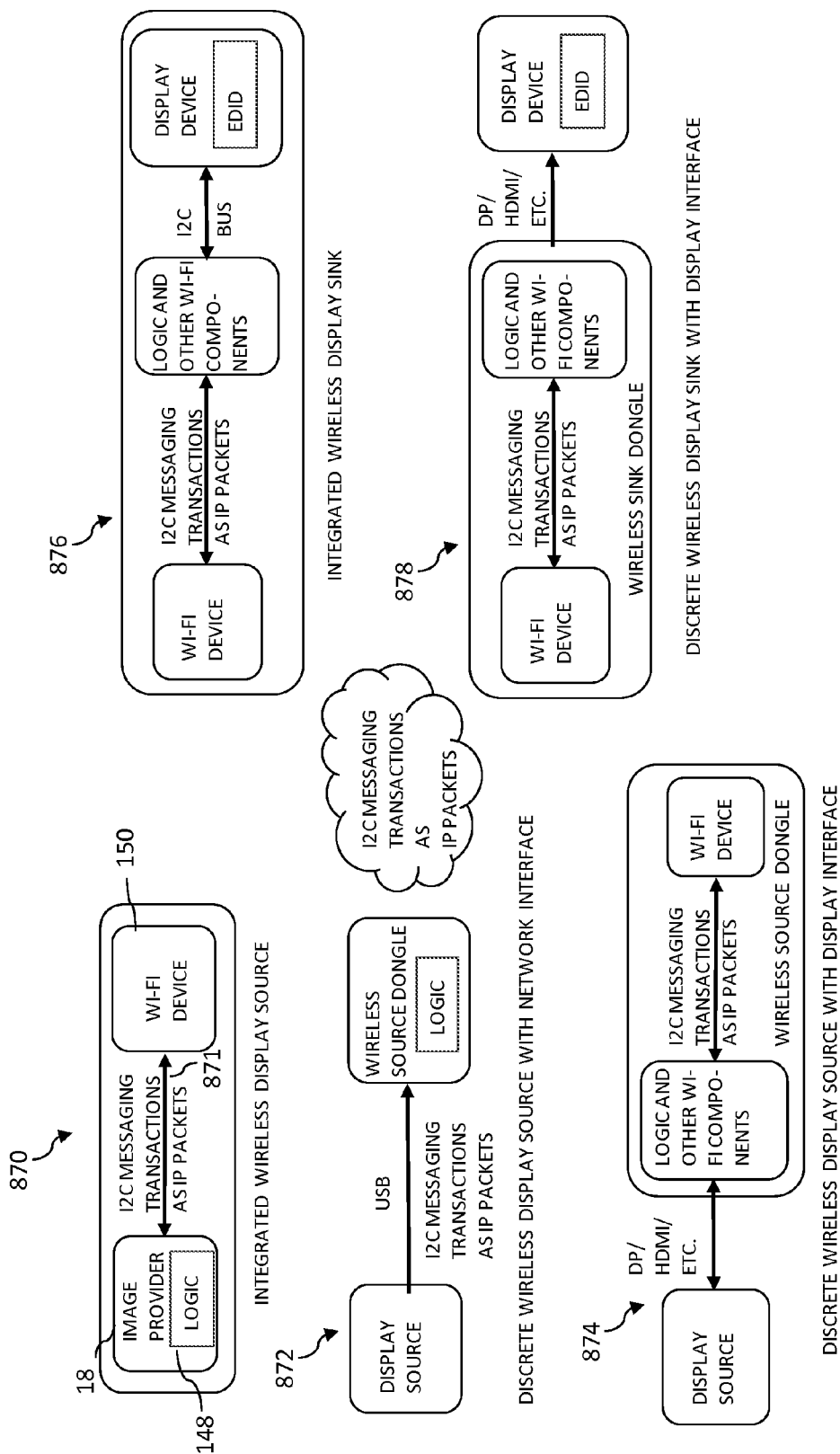
FIG. 12 is a block diagram of exemplary configurations of the image display systems of FIGS. 2 and 3.

FIG. 4 illustrates a flow diagram 400 of an exemplary operation performed by display source 112 of FIG. 2 (or source device 242 of FIG. 3 or display source 870, 872, 874 of FIG. 12). While FIG. 4 is described with respect to an internet protocol (IP), the operation of FIG. 4 may be used with any network protocol. At block 402, monitor control commands are translated to an internet protocol (IP) format to produce IP formatted monitor control commands. For example, monitor control commands received from image provider 18 in a format intended for multi-wire, bi-directional communication bus (e.g., I2C bus 146) are translated with translator module 154 to an IP format to produce IP formatted monitor control commands. The monitor control commands may include MCCS commands, data requests (e.g., EDID information requests), or other suitable commands for controlling monitor 16.

At block 404, the IP formatted monitor control commands are communicated to an IP port dedicated for communicating IP formatted monitor control commands. The IP formatted monitor control commands communicated to the dedicated IP port, such as an IP port of a destination device (e.g., sink device 144), are transmitted over IP communication link 140 for receipt at sink device 144. In one embodiment, communicating the IP formatted monitor control commands at block 404 includes identifying an IP port associated with a destination device, such as translator module 164 of sink device 144, and dedicating the IP port for communication of the IP formatted monitor control commands. For example, the logic 148 identifies an IP port, such as a port address or other suitable identifier, associated with translator module 164 of sink device 144 and dedicates that IP port for communication of the monitor control commands and monitor capability data. In one embodiment, a first IP port is identified as a dedicated port for communicating monitor control commands, and a second IP port is identified as a dedicated port for communicating monitor capability data. Logic 148 also identifies an IP port associated with source device 142 (e.g., associated with translator module 154) for communication between translator modules 154, 164. In one embodiment, source device 142 and sink device 144 negotiate to dedicate the IP ports associated with translator modules 154, 164. The identified IP port(s) is static and, once established, is used for communicating multiple IP formatted monitor control commands and data, although the dedicated IP port may alternatively be dynamically determined. As described herein, the communication of the IP formatted monitor control commands at block 404 may be via a wireless or wired IP interface 140.

Upon receipt of the IP formatted monitor control commands, translator module 164 of sink device 144 is operative to re-translate the IP formatted monitor control commands from the IP format to produce monitor control commands intended for communication over a multi-wire bidirectional bus, such as I2C bus 156, as described herein. Operation of monitor 16 is controlled based on the produced monitor control commands intended for communication over the multi-wire bidirectional bus, as described herein.

Figure 5:
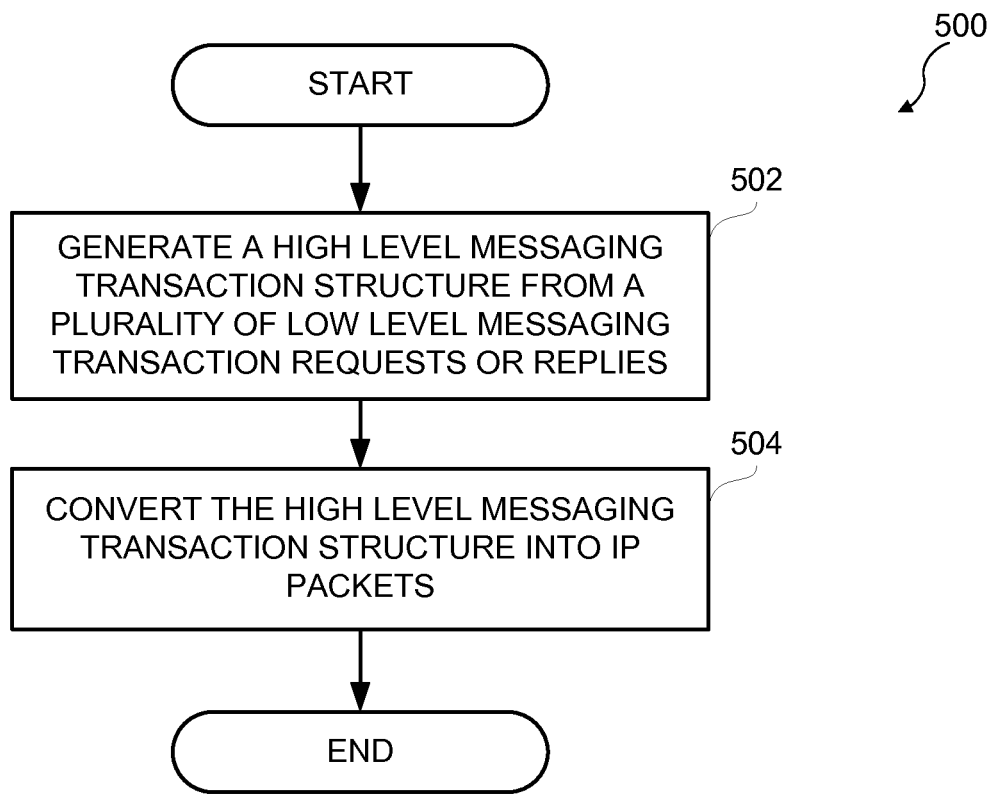
FIG. 5 is a flow chart of an exemplary method of operation of the display source of FIGS. 2 and 3 for translating monitor control commands to an IP format to produce IP formatted monitor control commands.

FIG. 5 illustrates a flow diagram 500 of an exemplary translation operation of block 402 of FIG. 4. Referring to FIG. 5, a high level messaging transaction structure is generated by translator module 154, for example, from a plurality of low level messaging transaction requests or replies, as illustrated at block 502. In particular, the monitor control commands provided over I2C bus 146 to translator module 154 include a plurality of low level messaging transaction requests. For example, in one embodiment, the monitor control commands are comprised of a plurality of single byte read requests or a single byte write requests intended for serial communication over I2C bus 146. The read requests may include requests to read monitor capability data (e.g., EDID structure) of monitor 16, and the write requests may include control commands (e.g., MCCS commands) operative to control operation of monitor 16, as described herein. Translator module 154 generates a high level (multi-byte) messaging transaction structure consisting of one or more low level (single byte) messaging transaction requests (e.g., read or write requests), i.e., one or more monitor control commands. In other words, the high level messaging transaction structure consists of a grouping of multiple low level requests and may comprise a multiple bytes of data. In one embodiment, each high level messaging transaction structure consists of up to 128 bytes, although other data structure sizes may be provided. See, for example, read and write request messaging transaction structures 700 and 720 illustrated in FIG. 7.1 and described herein.

At block 504, the high level messaging transaction structure is converted into internet protocol (IP) packets for communication over IP link 140. In particular, upon generating the high level messaging transaction structure at block 502 consisting of the monitor control commands, one or more IP packets suitable for communication over IP communication link 140 are created from the high level messaging transaction structure and communicated to sink device 144.

In another exemplary translation operation of block 402 of FIG. 4, after an operating system of image provider 18 issues an application programming interface (API) that includes a monitor control command and/or a request for monitor capability data (e.g., EDID request), a graphics driver of image provider 18 translates the API into one or more low level messaging transaction structures (e.g., single byte I/O read/writes). The low level messaging transaction structures received at source device 142 (e.g., over I2C bus 146) are accumulated by logic 148 and converted by logic 148 into one or more IP formatted, high level messaging transaction structures, as described herein. Logic 148 then translates the high level messaging transaction structures into IP packet payloads of one or more IP packets. The header of the IP packet also includes a source IP port (e.g., IP address of translator module 154) and a destination IP port (e.g., IP address of translator module 164). Transceiver 150 then transmits the IP packets over link 140 to the dedicated IP port associated with translator module 164 of display sink 114.

In the embodiment of integrated display source 870 described in FIG. 12, the translation of the monitor control commands into IP packets is done within logic 148 of image provider 18. For example, after an operating system of image provider 18 issues an API that includes a monitor control command and/or a request for monitor capability data (e.g., EDID request), a graphics driver of image provider 18 translates the API into one or more IP formatted, high level messaging transaction structures and then notifies a driver of the wireless transceiver 150, i.e., a driver contained in logic 148. Logic 148 then identifies an IP port of translator module 164 of sink device 144 and calls the operating system driver to send the IP formatted, high level messaging transaction structures as IP packets to the designated IP port of sink device 144. The IP packets containing the high level messaging transaction structures are transferred from image provider 18 to transceiver 150 over bus 871 (e.g., PCIe bus or USB), and transceiver 150 communicates the IP packets to the dedicated IP port of sink device 144 (FIG. 2). As such, an I2C bus is not used to communicate the monitor control commands and data in this embodiment.

Figure 6:
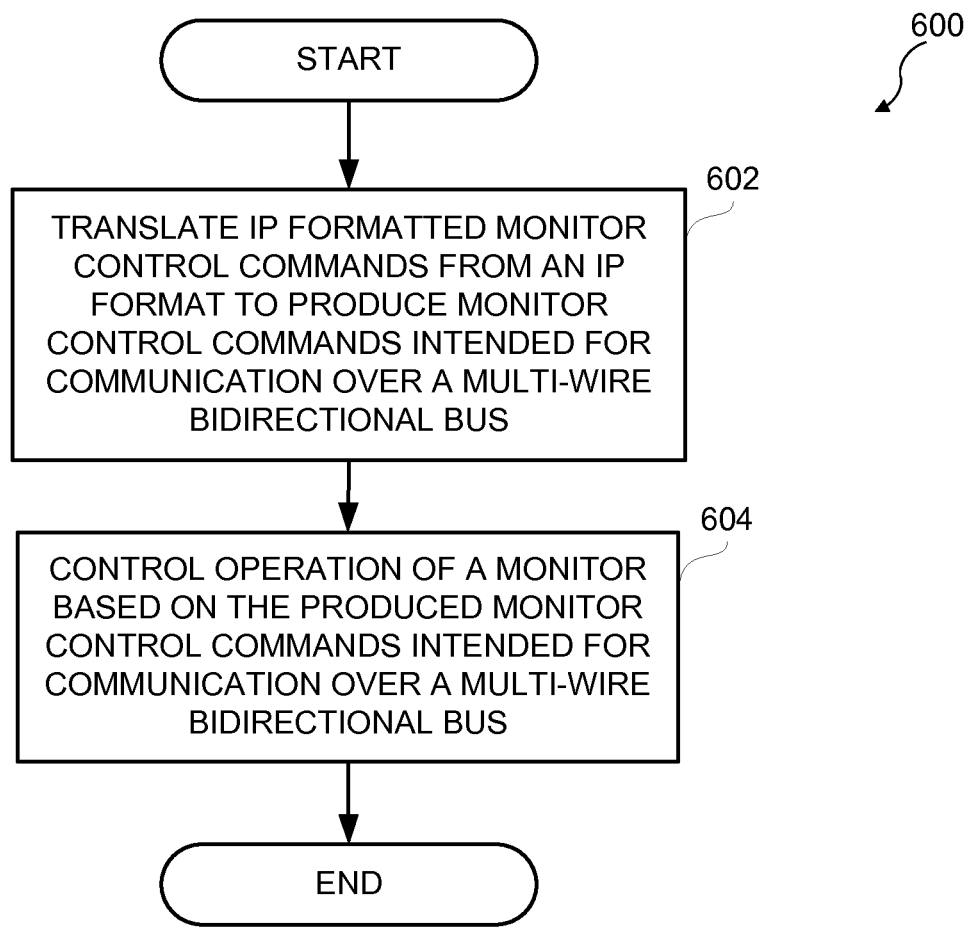
FIG. 6 is a flow chart of an exemplary method of operation of the display sink of FIGS. 2 and 3 for providing monitor control commands to a monitor controller.

FIG. 6 illustrates a flow diagram 600 of an exemplary operation performed by sink device 144 (and/or display sink 114) of FIG. 2 (or sink device 244 and/or display sink 214 of FIG. 3). While FIG. 6 is described with respect to an internet protocol (IP), the operation of FIG. 4 may be used with any network protocol. At block 602, IP formatted monitor control commands are translated from an IP format to produce monitor control commands intended for communication over a multi-wire bidirectional bus, such as I2C bus 156. In particular, upon receipt of the IP formatted monitor control commands from source device 142, translator module 164 of sink device 144 is operative to translate the IP formatted monitor control commands to produce monitor control commands intended for communication over a multi-wire bidirectional bus, such as I2C bus 156. In one embodiment, translator module 164 reverses the translation performed by translation module 154. For example, translator module 164 converts the IP packets received from display source 112 into one or more high level messaging transaction structures (e.g., multi-byte structure containing one or more read/write requests) and generates a plurality of low level messaging transaction requests (e.g., single-byte read or write commands) that are suitable for communication over a multi-wire bidirectional bus, such as I2C bus 156.

At block 604, the operation of a monitor, such as monitor 16, is controlled based on the produced monitor control commands intended for communication over the multi-wire bidirectional bus (e.g., I2C bus 156). In one embodiment, sink device 144 controls monitor 16 by communicating the produced monitor control commands over I2C bus 156 to monitor controller 26, and monitor controller 26 controls the operation of monitor 16 based on the produced monitor control commands, as described herein.

In one embodiment, when the produced monitor control command includes a read request operative to read monitor capability data (e.g., EDID structure, etc.) from monitor 16, monitor controller 26 is operative to communicate I2C formatted monitor capability data (e.g. EDID information) back to translator module 164 for communication back to image provider 18 of display source 112. In this embodiment, translator module 164 translates the requested monitor capability data (e.g., EDID information, etc.) intended for communication over a multi-wire bidirectional bus (e.g., I2C bus 156) to an IP format to produce IP formatted monitor capability data. Sink device 144 then communicates the produced IP formatted monitor capability data to an IP port (e.g., an IP port of translator module 154 of source device 142) dedicated for communicating IP formatted monitor capability data, as described herein. In one embodiment, logic 158 of sink device 144 identifies an IP port associated with a destination device, i.e., translator module 154 of source device 142, and dedicates the identified IP port for communicating the IP formatted monitor capability data.

Referring to FIGS. 7.1 and 7.2, several tables are illustrated that define exemplary high level messaging transaction structures that are generated from one or more low level messaging transaction requests and replies (e.g., single-byte, I2C formatted monitor control commands or replies), as described herein. Upon conversion to IP packets, the high level messaging transaction structures containing the monitor control commands and/or data replies may be communicated between the source device 142 and sink device 144 of FIG. 2 over IP communication link 140. Exemplary high level messaging transaction structures described in FIGS. 7.1 and 7.2 include read and write request data structures from display source 112 (see FIG. 7.1) and read and write reply (acknowledge) data structures from display sink 114 (see FIG. 7.2). Other suitable data structures may be provided.

Referring to FIG. 7.1, the data structure of table 700, which may be stored in a memory accessible by logic 148 of FIG. 2, converts I2C formatted, low level requests for monitor capability data (received from image provider 18 over I2C bus 146) into a high level messaging transaction structure ("remote I2C read request structure") for communication over IP interface 140. In the illustrated embodiment, a low level request for monitor capability data includes both I2C read requests and I2C write transactions or requests. For example, to request monitor capability data, image provider 18 first issues one or more I2C bus write requests which sets up the I2C read address offset associated with display sink 114 (FIG. 2), to identify a location of the monitor capability data (e.g., the EDID structure). Following the write request(s), image provider 18 issues a series of I2C formatted read requests that identify the monitor capability data to be read from display sink 114. In one embodiment, the I2C formatted read requests are single-byte requests, although the requests may alternatively be multi-byte requests. The data structure of table 700 is operative to collect these I2C bus write and read requests from image provider 18 (i.e., using the "for" loop 702) into a group or a block of low level requests to generate a high level messaging transaction read data structure that comprises multiple bytes of data. In one embodiment, each high level messaging transaction structure generated for monitor capability requests includes up to 128 bytes of data and includes at least one write request to identify the I2C read address and/or to set up the read request offset. In the illustrated embodiment, source device 142 sends the generated remote read request structure to sink device 144 using a TCP/IP port number assigned to initiate an I2C read from display sink 114.

The data structure of table 720 of FIG. 7.1, which may be stored in a memory accessible by logic 148 of FIG. 2, converts I2C formatted, low level monitor control commands (received from image provider 18 over I2C bus 146) into a high level messaging transaction structure ("remote I2C write request structure") for communication over IP interface 140. The converted monitor control commands may include MCCS commands, as described herein, in the form of one or more single byte I2C write requests. The data structure of table 720 is operative to collect these I2C bus write requests from image provider 18 (i.e., using the "for" loop 722) into a group or a block of low level requests to generate a high level messaging transaction write structure that comprises multiple bytes of data. In one embodiment, each high level messaging transaction structure generated for monitor control commands includes around 6 to 32 bytes of requests, although other suitable sizes may be provided. In the illustrated embodiment, source device 142 sends the generated remote write request structure to sink device 144 using a TCP/IP port number assigned to initiate I2C writes to display sink 114.

The data structures of tables 730, 740, 750, and 760 of FIG. 7.2, which may be stored in a memory accessible by logic 158 of sink device 144 of FIG. 2, converts I2C formatted, low level read and write reply acknowledgements (received from monitor controller 26 over I2C bus 156) into high level messaging transaction structures for communication over IP interface 140. The high level messaging transactions structures may include a single byte (e.g., a single acknowledgement reply from monitor controller 26) or multiple bytes of data. The data structures of Tables 730-760 are illustratively acknowledgement replies that indicate the success or failure of the receipt and/or implementation of a monitor control command or of a monitor capability request. For example, tables 730 and 750 define a data structure for converting one or more low level replies acknowledging a read or write success into a high level data structure. Tables 740 and 760 define a data structure for converting one or more low level replies acknowledging a read or write failure into a high level data structure. In the illustrated embodiment, sink device 144 sends the generated remote reply acknowledgment structures to source device 142 using TCP/IP port numbers assigned to indicate the success or failure of corresponding reads and writes performed and/or read data presented.

FIGS. 8-12 illustrate additional exemplary configurations of the image display systems 100, 200 of FIGS. 2 and 3. Each configuration illustrated in FIGS. 8-12 includes the functionality and operational capabilities of the image display systems 100, 200 of FIGS. 2 and 3. In one embodiment, the image display systems of FIGS. 8-12 conform to a wireless standard, such as the wireless display standard WFD of the Wi-Fi Alliance.

Figure 8:
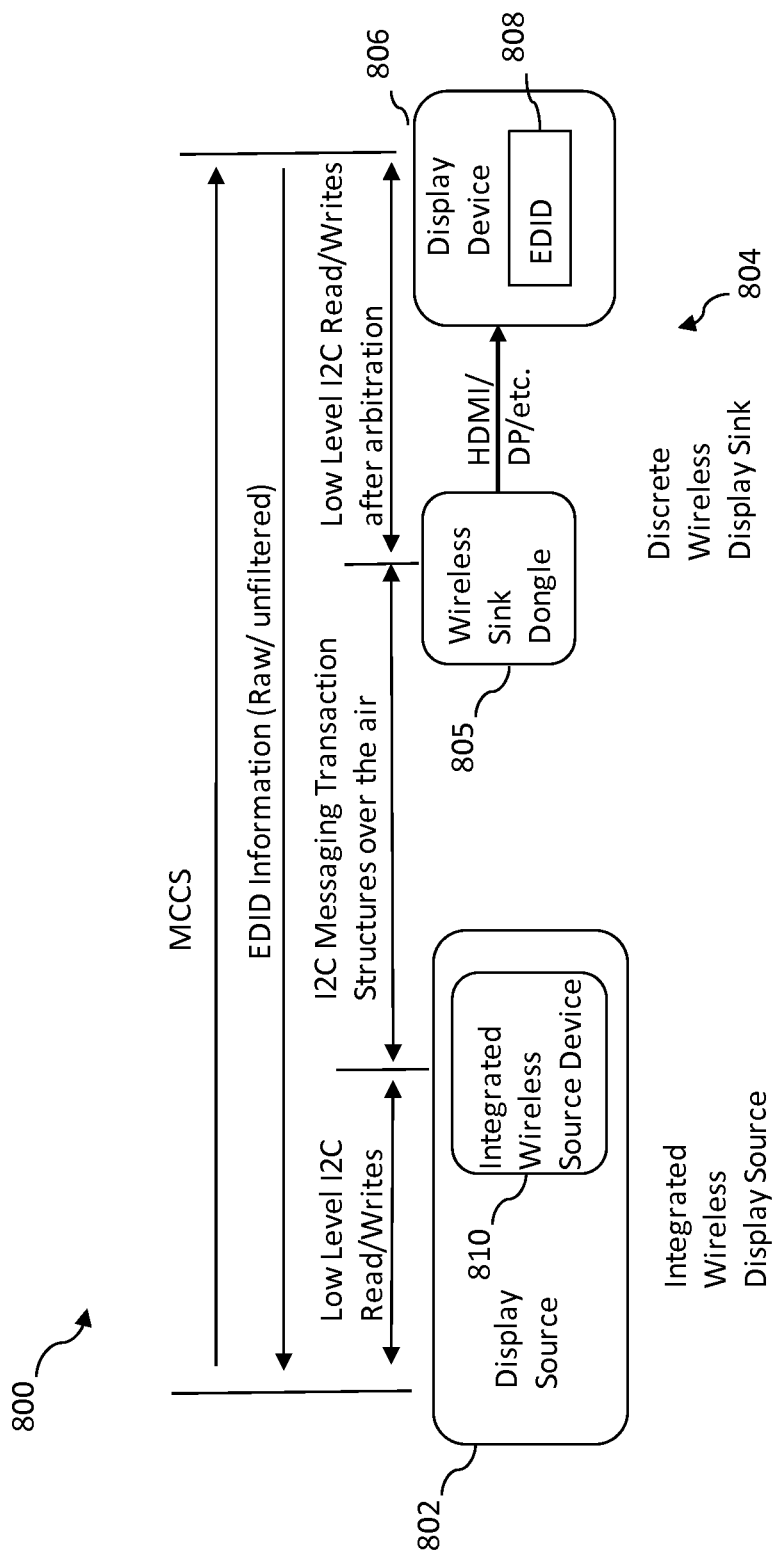
FIG. 8 is a block diagram of another exemplary image display system including an integrated wireless display source and a discrete wireless display sink.

Referring initially to FIG. 8, an image display system 800 includes an integrated wireless display source 802 and a discrete wireless display sink 804. Display source 802 includes an integrated wireless source device 810. Display sink 804 includes a discrete wireless sink device 805, illustratively a sink dongle 805, that is connected externally to an interface port (e.g., HDMI, DP, etc.) of a display device 806, such as a monitor, television, projector, etc. Source device 810 converts the low level I2C read/writes received from an image provider (not shown) of display source 802 to high level I2C messaging transactions structures communicated over the air to sink dongle 805, as described herein. Sink dongle 805 arbitrates the high level messaging transaction structures to low level I2C read/writes and provides the low level I2C read/writes to display device 806. Display device 806 further includes an EDID structure 808 that is readable by display source 802, as described herein.

In the embodiment of FIG. 8, display device or monitor 806 is controlled with MCCS commands and display source 802 reads unfiltered EDID information using the remote I2C read/write configuration (i.e., the transmission of the IP formatted I2C read/writes). Display source 802 includes an application (e.g. processed by an image provider) that makes display mode decisions based on the unfiltered EDID information as well as H.264 codec capability. In one embodiment, display source 802 is configured to read EDID information from different display devices 806 regardless of differences in the EDID structure 808 among the different display devices 806. As such, in one embodiment, the remote I2C read/write configuration provides an I2C tunneling method that is compatible with various image display systems configured for I2C bus communication.

Figure 9:
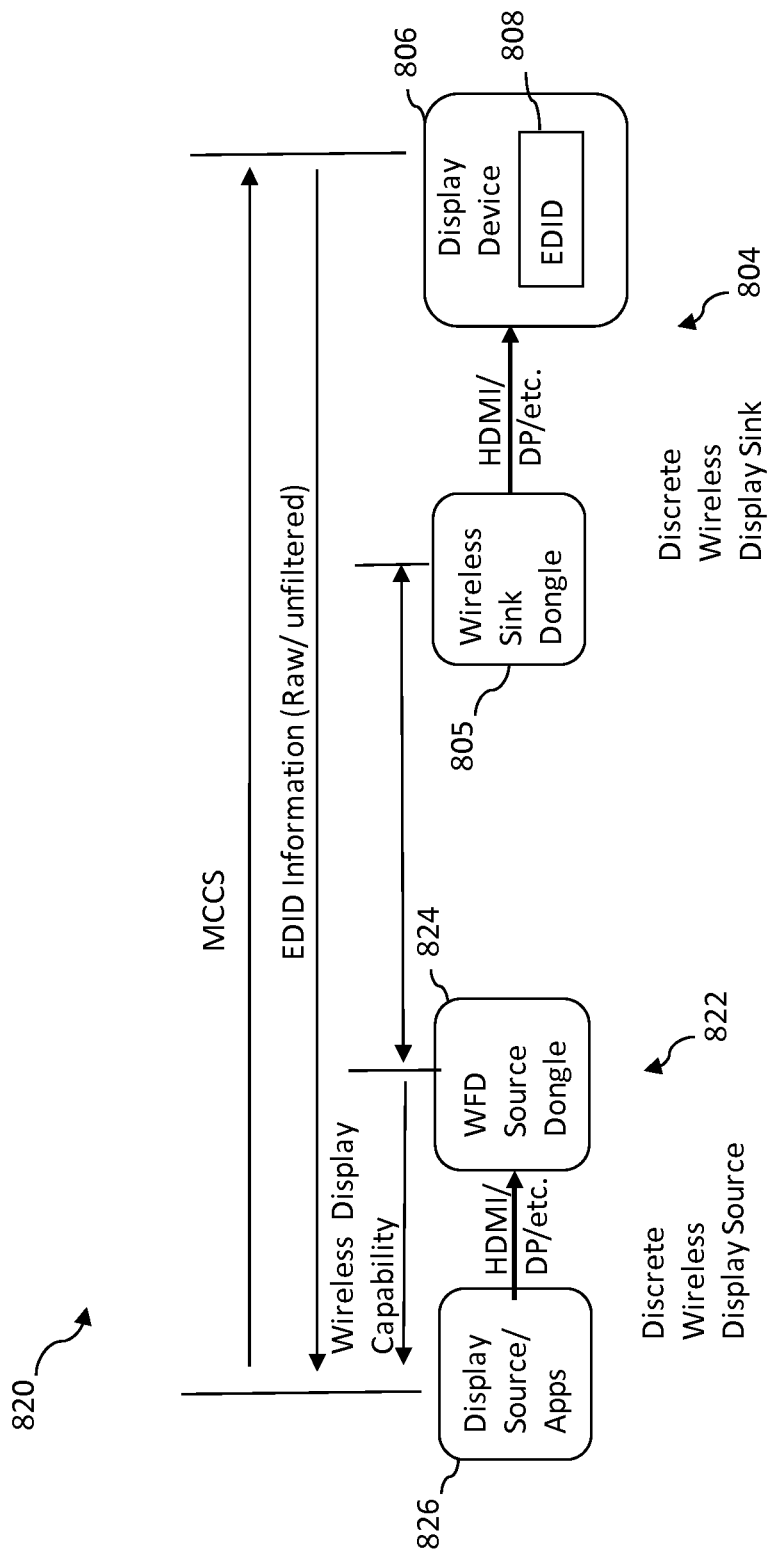
FIG. 9 is a block diagram of another exemplary image display system including a discrete wireless display source and a discrete wireless display sink.

Referring to FIG. 9, another exemplary image display system including a discrete wireless display source 822 and the discrete wireless display sink 804 of FIG. 8. Discrete wireless display source 822 includes a wireless source device 824, illustratively a source dongle 824, that is connected to an external interface port (e.g., HDMI, DP, etc.) of display source 826. In this embodiment, a display application of display source 826 obtains access to the wireless display device capability (e.g. H.264 codec subelement, etc.) of display device 806 through proprietary means. In the illustrated embodiment, display source 826 does not have access to the wireless capability of the source dongle 824. As in FIG. 8, display device or monitor 806 is controlled with MCCS commands and display source 826 reads unfiltered EDID information using the remote I2C read/write configuration (i.e., the transmission of the IP formatted I2C read/writes). Display source 826 includes an application that makes display mode decisions based on the unfiltered EDID information.

Figure 10:
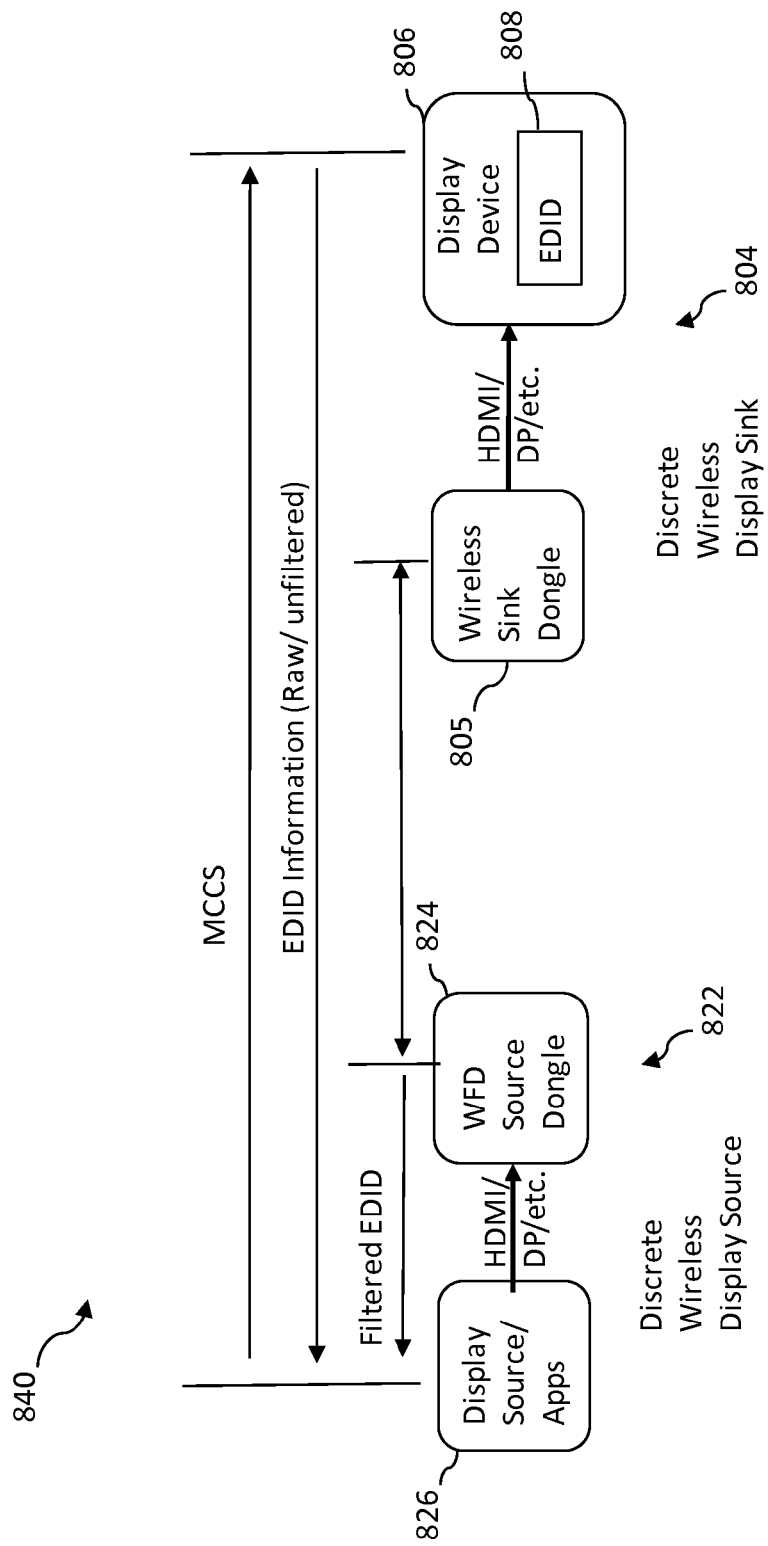
FIG. 10 is a block diagram of another exemplary image display system including a discrete wireless display source and a discrete wireless display sink.

Referring to FIG. 10, another exemplary image display system 840 is illustrated. System 840 is identical to system 820 of FIG. 9 with the exception of the EDID information being filtered by source dongle 824 before receipt by display source 826. In this embodiment, the display sink 804 does not filter the EDID information, and EDID filtering is performed by source dongle 824 only in the case where wireless device capability of dongle 824 cannot be communicated to display source 826. In one embodiment, display modes within the wireless display (e.g., WFD by Wi-Fi Alliance) capability are not filtered even if it is not on the H.264 codec subelement tables.

Figure 11:
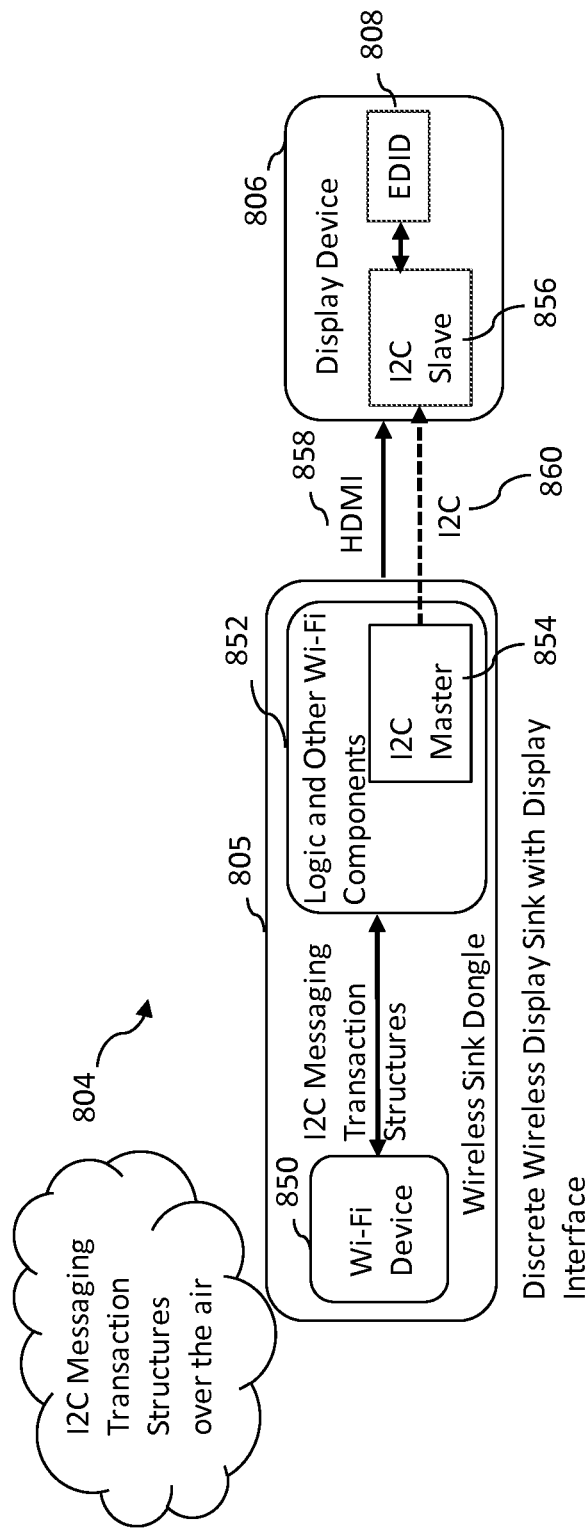
FIG. 11 is a block diagram of an exemplary discrete wireless display sink of FIGS. 8-10.

Referring to FIG. 11, another exemplary configuration of discrete wireless display sink 804 of FIGS. 8-10 is illustrated. Display sink dongle 805 of FIG. 11 includes a wireless or Wi-Fi device 850, such as a wireless transceiver, that receives high level Remote I2C Read/Write structures over the air from a display source, as described herein. Dongle 805 further includes logic and other Wi-Fi components 852. Logic 852 includes an I2C master node 854 (e.g., microprocessor, discrete logic, etc.) that issues clock and data/address requests with an I2C slave node 856 of display device 806 to control I2C communication over the I2C bus 860 of HDMI interface 858.

In one embodiment, logic 852 arbitrates the Remote I2C Read/Write requests among other internal I2C read/write requests. After arbitration, the display sink 805 initiates a series of I2C bus read/writes (using its I2C master node 854) as requested by the Remote I2C Read/Write request structure. After the completion of an entire series of I2C bus read/writes, display sink 805 sends a Remote I2C acknowledge reply messaging structure back to the display source.

Referring to FIG. 12, various configurations of the image display systems 100, 200 of FIGS. 2 and 3 are illustrated. Exemplary display source configurations include an integrated wireless display source 870 (described herein), a discrete wireless display source 872 with a network interface, and a discrete wireless display source 874 with a display interface. Display source 872 illustratively includes a USB interface between the display source and the wireless source dongle, while display source 874 includes a DP, HDMI, or other suitable interface between the display source and the wireless source dongle. Exemplary display sink configurations include an integrated wireless display sink 876 and a discrete wireless display sink 878 with a display interface, such as DP, HDMI, or other suitable interface. In the exemplary configurations of FIG. 12, the remote I2C messaging transaction structure may be tunneled through Wi-Fi as IP packets (e.g., TCP/IP), as described herein. Further, in one embodiment, Wi-Fi logic is not required to parse I2C commands as they may be generated/interpreted by the source/sink logic above Wi-Fi.

Among other advantages, the method and apparatus allows for communication of monitor control commands, monitor capability information, and other monitor data between a display source and a display sink using an internet protocol (IP) communication interface, such as a wireless interface. The enabled communication of monitor control commands, capability data, and other data intended for communication over an I2C bus, for example, allows a display source communicating over an IP communication interface to control the display operations and the display features and capabilities of the display system, as described herein. Other advantages will be recognized by those of ordinary skill in the art.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

What is claimed is:

1. A method carried out by an electronic device comprising:
    translating monitor control commands to a network protocol format to produce network protocol formatted monitor control commands; and
    communicating the network protocol formatted monitor control commands to a network protocol port dedicated for communicating network protocol formatted monitor control commands, wherein translating the monitor control commands to a network protocol format to produce network protocol formatted monitor control commands comprises:
        generating a high level messaging transaction structure from a plurality of low level messaging transaction requests or replies; and
        converting the high level messaging transaction structure into network protocol packets.

2. The method of claim 1, wherein translating the monitor control commands to a network protocol format to produce network protocol formatted monitor control commands comprises translating monitor control commands intended for communication over a multi-wire bidirectional bus, and wherein the method comprises wirelessly communicating the network protocol formatted monitor control commands.

3. The method of claim 1, wherein communicating the network protocol formatted monitor control commands to the dedicated network protocol port comprises identifying a network protocol port of a destination device and dedicating the identified network protocol port for communicating network protocol formatted monitor control commands.

4. The method of claim 1, further comprising converting single-byte based monitor read or write commands into multi-byte monitor read or write requests.

5. The method of claim 1, further comprising:
    re-translating network protocol formatted monitor control commands from a network protocol format to produce monitor control commands intended for communication over a multi-wire bidirectional bus; and
    controlling operation of a monitor based on the produced monitor control commands intended for communication over the multi-wire bidirectional bus.

6. The method of claim 5, further comprising communicating the produced monitor control commands over the multi-wire bidirectional bus in the monitor to control the monitor operation.

7. The method of claim 1, wherein the network protocol format includes an internet protocol (IP) format, and wherein the network protocol port includes an internet protocol (IP) port.

8. A method carried out by an electronic device comprising:
    translating network protocol formatted monitor control commands from a network protocol format to produce monitor control commands intended for communication over a multi-wire bidirectional bus including generating a plurality of low level messaging transaction requests or replies from a high level messaging transaction structure;
    controlling operation of a monitor based on the produced monitor control commands intended for communication over the multi-wire bidirectional bus;
    translating monitor capability data intended for communication over a multi-wire bidirectional bus to a network protocol format to produce network protocol formatted monitor capability data; and
    communicating the produced network protocol formatted monitor capability data to a network protocol port dedicated for communicating network protocol formatted monitor capability data.

9. The method of claim 8, further comprising converting multi-byte monitor read or write requests into single-byte based monitor read or write commands.

10. The method of claim 8, wherein communicating the produced network protocol formatted monitor capability data to the dedicated network protocol port comprises identifying a network protocol port of a destination device and dedicating the identified network protocol port for communicating the produced network protocol formatted monitor control commands.

11. The method of claim 8, further comprising receiving the network protocol formatted monitor control commands wirelessly from a remote display source.

12. The method of claim 8, further comprising communicating the produced monitor control commands over the multi-wire bidirectional bus in the monitor to control the monitor operation.

13. The method of claim 8, wherein the network protocol formatted monitor control commands include internet protocol (IP) formatted monitor control commands, and wherein the method comprises translating IP formatted monitor control commands from an IP format to produce monitor control commands intended for communication over a multi-wire bidirectional bus.

14. A wireless device comprising:
    a wireless transceiver;
    logic, operatively coupled to the wireless transceiver, operative to translate monitor control commands to an internet protocol (IP) format to produce IP formatted monitor control commands and to communicate the IP formatted monitor control commands to an IP port dedicated for communicating IP formatted monitor control commands, wherein the logic is further operative to generate a high level messaging transaction structure from a plurality of low level messaging transaction requests or replies and to convert the high level messaging transaction structure into internet protocol (IP) packets.

15. The wireless device of claim 14, wherein the monitor control commands are intended for communication over a multi-wire bidirectional bus.

16. The wireless device of claim 15, wherein the multi-wire bidirectional bus comprises an inter-integrated circuit bus.

17. The wireless device of claim 14, wherein the logic is further operative to identify an IP port of a destination device as the dedicated IP port.

18. The wireless device of claim 14, wherein the logic is further operative to convert single-byte based monitor read or write commands into multi-byte monitor read or write requests.

19. The wireless device of claim 14, wherein the logic comprises a central processing unit (CPU), and further comprising a graphics processing unit (GPU) operatively coupled to the CPU and configured to provide image data to the wireless transceiver, and wherein the wireless transceiver is operative to communicate the image data and the IP formatted monitor control commands to a wireless transceiver associated with a monitor.

20. The wireless device of claim 14, wherein the wireless device comprises a dongle including at least one of a universal serial bus (USB) interface, a DisplayPort (DP) interface, a high definition multimedia interface (HDMI), a video graphics array (VGA) interface, and a digital video interface (DVI).

21. The wireless device of claim 14, wherein the wireless transceiver is a short range wireless transceiver.

22. A wireless device comprising:
a wireless transceiver;
logic, operatively coupled to the wireless transceiver, operative to translate internet protocol (IP) formatted monitor control commands from an IP format to produce monitor control commands intended for communication over a multi-wire bidirectional bus and to control operation of a monitor based on the produced monitor control commands intended for communication over the multi-wire bidirectional bus, the logic is further operative to generate a plurality of low level messaging transaction requests or replies from a high level messaging transaction structure, and the logic is operative to convert multi-byte monitor read or write requests into single-byte based monitor read or write commands the logic being further operative to translate monitor capability data intended for communication over a multi-wire bidirectional bus to a network protocol format to produce network protocol formatted monitor capability data; and communicate the produced network protocol formatted monitor capability data to a network protocol port dedicated for communicating network protocol formatted monitor capability data.

23. The wireless device of claim 22, wherein the multi-wire bidirectional bus comprises an inter-integrated circuit bus.

24. The wireless device of claim 22, further comprising a monitor operatively coupled to the logic and operative to display image data received with the wireless transceiver.

25. The wireless device of claim 22, wherein the logic comprises a microprocessor, and wherein the wireless transceiver is operative to receive the IP formatted monitor control commands from a wireless transceiver associated with a remote display source.

26. The wireless device of claim 22, wherein the wireless device comprises a dongle including at least one of a universal serial bus (USB) interface, a DisplayPort (DP) interface, a high definition multimedia interface (HDMI), a video graphics array (VGA) interface, and a digital video interface (DVI).

27. The wireless device of claim 22, wherein the wireless transceiver is a short range wireless transceiver.

28. A wireless display comprising:
a monitor;
a controller operatively coupled to the monitor and operative to provide image data to the monitor for display on the monitor; and
a wireless device, operatively coupled to the controller, comprising a wireless transceiver and logic, the logic being operative to translate internet protocol (IP) formatted monitor control commands from an IP format to produce monitor control commands intended for communication over a multi-wire bidirectional bus, the controller controlling operation of the monitor based on the produced monitor control commands intended for communication over the multi-wire bidirectional bus, wherein the logic of the wireless device is operative to convert a high level messaging transaction structure into a plurality of low level messaging transaction requests; the logic being further operative to translate monitor capability data intended for communication over a multi-wire bidirectional bus to a network protocol format to produce network protocol formatted monitor capability data; and communicate the produced network protocol formatted monitor capability data to a network protocol port dedicated for communicating network protocol formatted monitor capability data.

29. The wireless display of claim 28, further comprising a display interface operatively coupled to the wireless device and the controller, the display interface including a multi-wire bidirectional bus, the logic of the wireless device being operative to communicate the produced monitor control commands to the controller over the multi-wire bidirectional bus of the display interface.

30. The wireless display of claim 29, wherein the multi-wire bidirectional bus comprises an inter-integrated circuit bus.

31. The wireless display of claim 28, wherein the produced monitor control commands are operative to control at least one of display color, display geometry, and image display parameters of the monitor.

32. The wireless display of claim 31, wherein the image display parameters include at least one of image orientation, zoom, brightness, contrast, gamma, focus, backlight control, and white point.

33. The wireless display of claim 28, wherein the high level messaging transaction structure comprises multi-byte monitor read or write requests and the low level messaging transaction requests comprise single-byte based monitor read or write commands.

34. A display system comprising:
a display source comprising:
a short range wireless transceiver, and
logic, operatively coupled to the short range wireless transceiver, operative to translate monitor control commands to an internet protocol (IP) format to produce IP formatted monitor control commands and to communicate the IP formatted monitor control commands to an IP port dedicated for communicating IP formatted monitor control commands; and
a wireless display comprising:
a monitor,
a controller operatively coupled to the monitor for controlling the monitor, and
a wireless device, operatively coupled to the controller, comprising a short range wireless transceiver and logic, the short range wireless transceiver of the wireless device being operative to receive the IP formatted monitor control commands from the short range wireless transceiver of the display source, the logic of the wireless device being operative to translate the received IP formatted monitor control commands from the IP format to produce monitor control commands intended for communication over a multi-wire bidirectional bus, the controller controlling operation of the monitor based on the produced monitor control commands intended for communication over the multi-wire bidirectional bus; wherein the logic of the wireless device is operative to convert a high level messaging transaction structure into a plurality of low level messaging transaction requests.

35. The display system of claim 34, wherein the display source further comprises an image provider operative to provide monitor control commands intended for communication over a multi-wire bidirectional bus to the logic of the display source, the image provider being further operative to provide image data to the display device for display on the monitor.

36. The display system of claim 35, wherein the image provider communicates the image data over the short range wireless transceiver of the display source.

37. The display system of claim 35, wherein the image provider comprises at least one processor.

38. The display system of claim 34, wherein the IP port dedicated for communicating IP formatted monitor control commands is an IP port associated with the wireless device of the wireless display.

* * * * *